No. 818,930. PATENTED APR. 24, 1906.
E. H. YULE.
HARNESS.
APPLICATION FILED SEPT. 5, 1905.
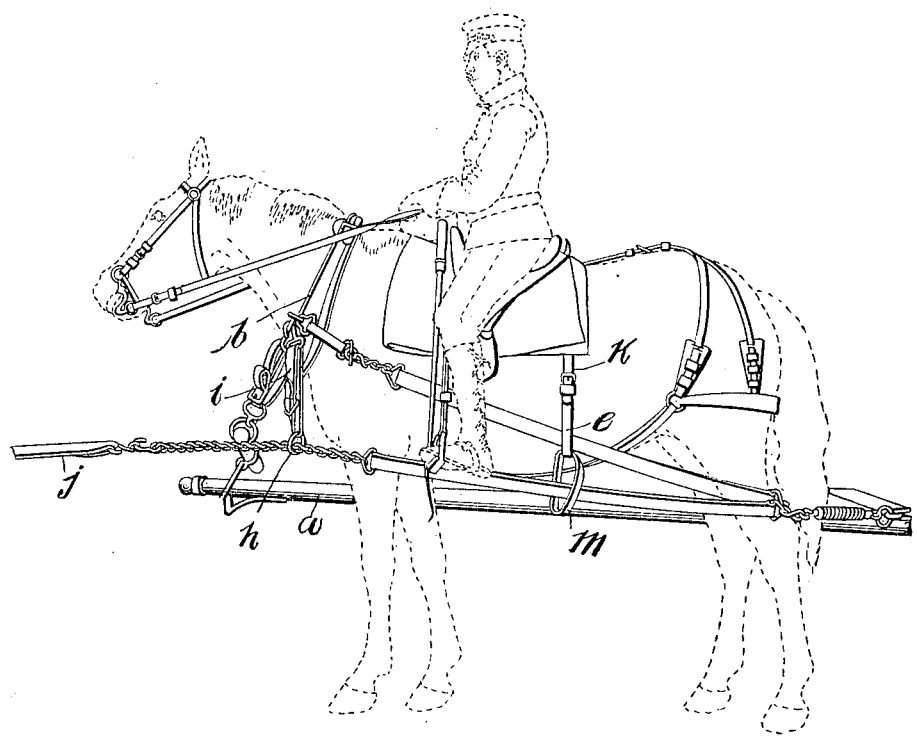
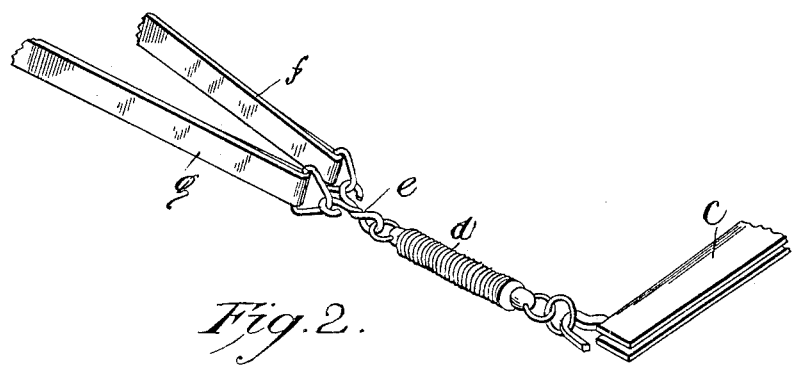

UNITED STATES PATENT OFFICE.

EDGAR H. YULE, OF SAN FRANCISCO, CALIFORNIA, ASSIGNOR OF ONE-HALF TO FREDERICK W. YULE, OF TIPTON, IOWA.

HARNESS.

No. 818,930.  Specification of Letters Patent.  Patented April 24, 1906.

Application filed September 5, 1905. Serial No. 277,025.

*To all whom it may concern:*

Be it known that I, EDGAR H. YULE, a citizen of the United States, residing at San Francisco, in the county of San Francisco and State of California, have invented certain new and useful Improvements in Harness; and I do hereby declare the following to be a full, clear, and exact description of the invention, such as will enable others skilled in the art to which it appertains to make and use the same.

My invention relates to improvements in harness, and is more especially designed for use in connection with artillery or artillery-wagons, although it is not restricted to such use.

The object of my invention is to provide a harness which gives a straight line of draft from the swingletree to the lead horses and an independent line of draft for the wheel-horses, thus obviating undue strains upon the wheel-horses, (which are usually larger and heavier than the swing and lead horses.)

The harness now in common use is objectionable for the reason that when all six horses are pulling their proportionate amount of the load there is an unnecessary downward pull on the wheel-horses' necks. This, in addition to the weight of the collar, pole, and pole-yoke, puts at times an enormous load on the necks of the leaders, and practical experience has shown that after a short period of actual service almost all the wheel-horses are afflicted with sore necks, a thing which rarely happens with the swing or lead horses. When the horses are going uphill, this downward pull is very noticeable, the result being that the wheel-horses show a constant tendency to lag until the trace-tugs on their collars are almost perpendicular, and in some instances the strain is so great that the wheel-horses give way under it by crouching or kneeling, or, in other words, by proceeding with a stumbling gait. Furthermore, I have found that the wheel-horses soon become broken down in front by carrying this undue load upon the fore legs. These objections are removed by my improved harness.

In the accompanying drawings, Figure 1 is a side view of my improved harness, showing also a wheel-horse and artilleryman in dotted lines; and Fig. 2 is a detailed view, on a larger scale, showing the double traces and the cockeye.

$a$ represents the pole, supported from the collars $b$ in the usual manner.

$c$ represents the swingletree, to which is attached, through the medium of the strong spring $d$, the double cockeye $e$. To one of the hooks the trace $f$ is attached, which trace runs directly to a fastening on the collar of the wheel-horse. To the other hook of the cockeye a trace $g$ is attached, which runs through a loop $h$, carried by a strap $i$ on the collar of the wheel-horse and which is attached to the harness $j$ of the swing-horse. The traces $f$ and $g$ are supported near their centers by the loin-strap $k$, provided with two loops $e$ and $m$, one for each of said traces. The traces may be made of any desired material, such as leather, steel cable, chain, &c.

The harness thus described has been tested long and exhaustively. A battery has been operated over steep and rugged hills, has gone through deep sand, has taken fifteen-mile practice marches, and, in addition, has been thoroughly tested in countermarching and reversing at a trot and gallop, and in every case it has worked satisfactorily.

The advantages of this harness are as follows:

First. There is no downward pull on the wheel-horses' necks from the leaders.

Second. It allows the wheel-horses to exert more of an upward pull upon the carriage when it drops into a rut, low place, or sinks into soft ground.

Third. It eliminates the jerk on the wheelers' necks in going downgrade or across ditches, as when the lead-horses and swing-horses go into draft, as they often do after they have crossed the ditch and recovered themselves and the wheel-horses are still in the ditch and not in draft. By reason of the fact that the lead-horses and swing-horses have an independent line of draft they come into it and keep the carriage moving at a critical moment after they have crossed the obstruction and fully recovered themselves. The wheel-horses are not interfered with as they are crossing the bad place and have perfect freedom of movement in coming up the bank and come into draft gradually after having recovered themselves from holding the carriage back and going through the ditch.

Fourth. The seesaw motion on the wheel-horses' necks is eliminated, this motion being caused by the fact that the lead-horses and swing-horses do not keep in step. This seesaw motion is considerable when all the horses are in draft, as they should be.

Fifth. The wheel-horses have complete freedom of motion at all times.

Sixth. The wheel-horses are not held down with a load on their necks from the pull of the horses in front of them.

Seventh. The arrangement lowers the traces of the swing-horses, so that their collars do not slip upward when in draft and choke the horses.

Having thus described my invention, what I claim as new, and desire to secure by Letters Patent, is—

1. In a harness, the combination of two sets of traces, one set adapted to be attached to the collars of the wheel-horses, and the other set to be attached to the collars of the swing or lead horses, guides for said traces, a double cockeye to which the rear end of each set of the traces is secured, and means for securing said cockeye to the swingletree, substantially as described.

2. In a harness, the combination of two sets of traces, one adapted to be attached to the collars of the wheel-horses, and the other to the collars of the swing-horses, guides for said traces, a double cockeye to which the rear end of one trace of each set is secured, and a coil-spring attached to said cockeye and adapted to be attached to the swingletree, substantially as described.

3. In a harness, the combination of two sets of traces, one adapted to be fastened to the collars of the wheel-horses, and the other to the collars of the swing-horses, a loin-strap adapted to pass over the wheel-horses and provided with two loops supporting said traces respectively, double cockeyes to each of which two of said traces are attached, a coil-spring connecting each of said cockeyes with the swingletree, and guides for the swing-horse traces extending downwardly from the collars of the wheel-horses, substantially as described.

In testimony whereof I affix my signature in presence of two witnesses.

EDGAR H. YULE.

Witnesses:
   Geo. H. Roundey,
   F. D. Carr.